March 28, 1950     A. A. HEYMAN     2,501,939
ICE CREAM CUP
Filed Sept. 24, 1948
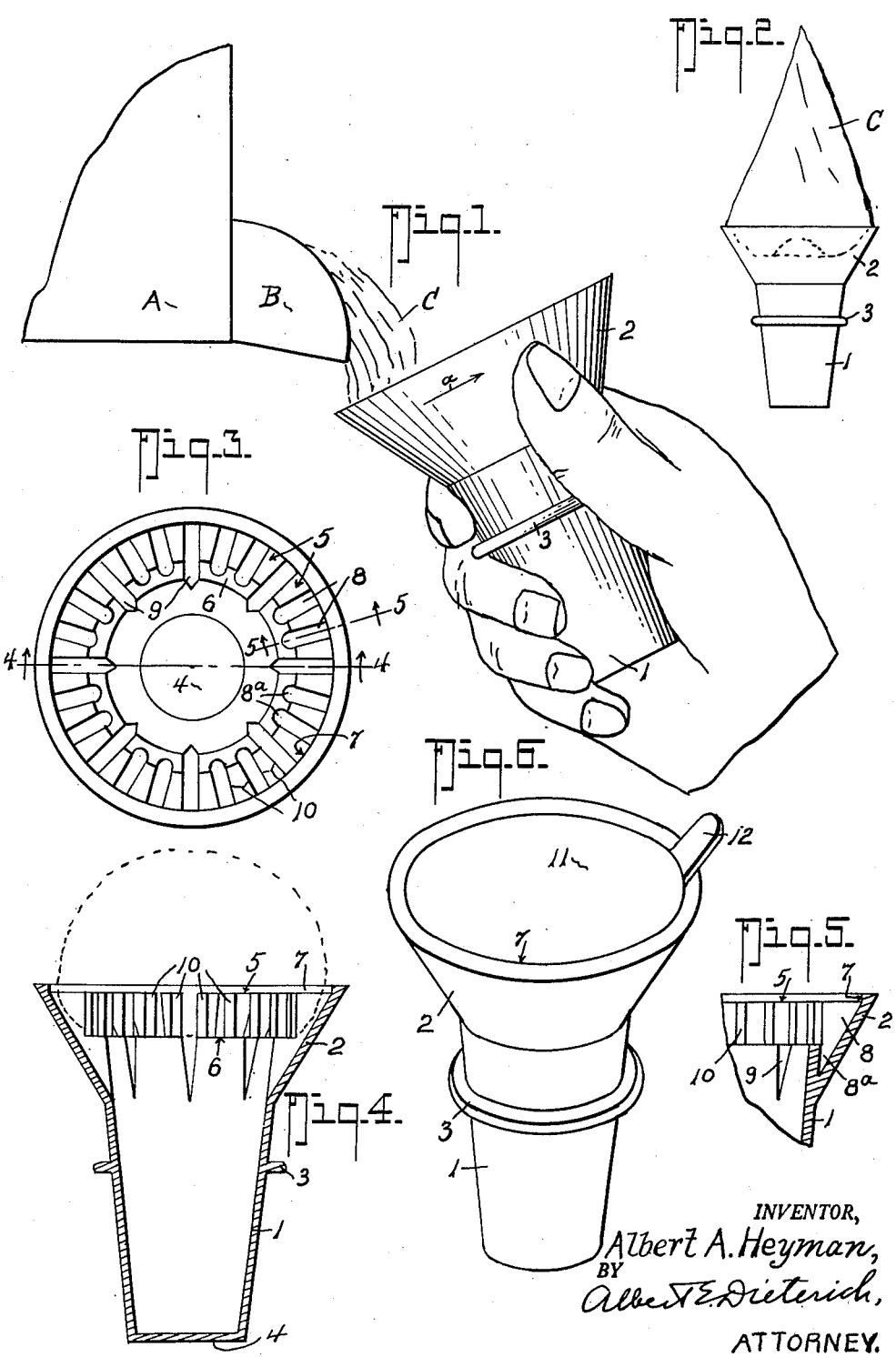
INVENTOR,
Albert A. Heyman,
BY Albert E. Dieterich,
ATTORNEY.

Patented Mar. 28, 1950

2,501,939

UNITED STATES PATENT OFFICE 2,501,939

ICE-CREAM CUP

Albert Aba Heyman, Baltimore, Md., assignor to Maryland Baking Company, Inc., Baltimore, Md., a corporation of Maryland Application September 24, 1948, Serial No. 50,907

4 Claims. (Cl. 99—89)

My invention relates to pastry cups for serving ice cream and it has for its objects:

1. To provide a cup which is especially adapted for dispensing soft or semi-frozen ice cream from ice cream mix machines.

2. To provide a pastry cup for receiving and holding high peaked ice cream, such as is commonly known as frozen custard, without the use of dippers or spoons.

3. To provide a pastry cup for the above purpose which also may be used for serving ordinary hard ice cream with the help of a dipper or spoon.

4. To provide a pastry cup for the purposes above mentioned which has provision to receive a cover disc so that the cup may be used to be filled with ice cream and stored in a freezer until sold as a unitary article, viz., ice cream and pastry.

5. To provide a pastry cup with means to hold a ball of hard ice cream high so that most of the ice cream can be eaten before the cup is bit into, if desired, and by the use of which as the ice cream is being eaten from the top the residue will gradually work down, as it melts, into the lower portion of the cup and not overflow to mess the user's hand.

6. To provide cups embodying all the above objects and advantages and yet be so constructed that the cup can be nested for storage and shipment, the nesting being such that air may circulate within and without the nested cups as atmosphere changes occur so as to prevent the cups becoming spoiled.

To the attainment of the aforesaid objects and ends, invention resides in the novel features of construction, combination and arrangement of parts hereinafter described and claimed, reference being had to the accompanying drawing in which:

Fig. 1 is a perspective view illustrating the invention in use.

Fig. 2 is an elevation, on a reduced scale, showing the cup of Fig. 1 after it has received its supply of ice cream.

Fig. 3 is a top plan view of the cup shown in Fig. 1.

Fig. 4 is a section on the line 4—4 of Fig. 3.

Fig. 5 is a detail section on the line 5—5 of Fig. 3.

Fig. 6 is a perspective view of a cup with a cover disc in place.

In the drawing in which like numerals and letters of reference indicate like parts in all the figures, A is the ice cream machine and B its spout, while C indicates the soft ice cream.

The cup which embodies my invention comprises a body 1 having a flat bottom 4 and a widely flared top portion 2, the diameter of which is preferably about 2 and 11/16 inches while the greatest width of the body 1 is preferably 1¼ inches and the bottom about 1 inch, the angle of the flared portion being preferably about 30°. A nesting ring 3 is provided spaced a suitable distance below the flared portion 2 to permit proper nesting of the cups.

The flared portion 2 is provided with toothlike members 10 spaced apart by slots 8 and 9. The tops 5 of the members 10 lie in a plane normal to the axis of the cup and spaced from the edge of the same to provide an annular wall 7, and constitute a seat for a cover disc 11. The disc 11 may be provided with a pull tab 12 or equivalent by means of which the cover 11 can be removed from the cup. The flared portion of the cup has a counter sunk portion providing a seat 6 for the nesting ring 3 of a cup when one cup is placed in the other as in nesting a number of cups together.

Some of the slots extend through the material of the cup and open into the interior of the cup, as at 9, while the others 8 only extend part way down to constitute blind pockets 8a (Figs. 3 and 5).

The teeth or radially disposed ribs 10 serve a twofold purpose, namely, they provide a means to take hold of the soft ice cream as it comes from the spout B and by rotating the cup on its axis at the same time (Fig. 1) the ice cream will bridge the entrance to the cup (dotted lines Fig. 2) and by lowering the cup as it is rotated an inverted cone of ice cream (Fig. 2) will be formed. The bridge of ice cream will be held up a considerable length of time by the teeth 10 and seat 6 and the air trapped in pockets 8a and body 1, giving ample time to eat away the top of the inverted cone of ice cream C (Fig. 2) before the residue works down into the body 1 and displaces the air therein.

I am aware that ice cream cones have heretofore been provided with ribs of one sort or another in the bowls of the same but none of those cones have been designed or adapted for use in forming inverted cones of ice cream fed directly from an ice cream machine.

A cup of the construction illustrated and described and in approximately the proportions stated is quite a stable support for the "mountain" of ice cream C (Fig. 2) when the cup is set down on a counter, and it will easily fit the hand of the dispenser while holding it, as shown in Fig. 1 and rotating it with his thumb and forefinger in the direction of the arrow "a."

The provision of the deep open slots 9 allows air circulation when cups are stacked together and prevents the cups getting moldy or soggy over a long period of time, as during storage and shipment.

Further the annular wall 7 and the tops 5 of the teeth 10 constitute a seat for a disc 11 of stiff paper or cardboard, which disc 11 is pressed tightly in place after the cup as a whole has been filled with soft cream in the ordinary way preparatory to putting the cup into a freezer or cold storage room.

From the foregoing description taken in connection with the accompanying drawing it is thought the construction, uses and advantages of my invention will be clear to those skilled in the art to which it appertains.

What I claim is:

1. A pastry cup comprising a body portion having a flat bottom and a flared top portion, the top portion being provided internally with radially disposed teeth whose opposing edges lie in planes parallel to the axis of the cup, said flared portion also having a nesting ring receiving flat seat surrounded by said teeth and located a substantial distance below said teeth, said body portion having a nesting ring of a diameter to fit within the space between the opposing edges of the teeth of a cup of like construction and rest upon the nesting ring receiving seat of the same.

2. A pastry cup comprising a body portion and a flared top portion, a nesting ring on said body portion, said flared top portion having a nesting ring receiving flat seat spaced downwardly from the mouth of and within said flared portion, said flared portion also having a set of radially disposed teeth located wholly above said seat, the inner edges of said teeth being diametrically spaced apart a distance greater than the over-all diameter of said nesting ring, by virtue of which one cup will nest within another cup of like construction with the nesting ring of the inner cup resting upon the seat of the outer cup while surrounded by the teeth of the outer cup.

3. A pastry cup comprising a body portion and a flared top portion, a nesting ring on said body portion, said flared top portion having a nesting ring receiving flat seat spaced downwardly a substantial distance from the mouth of and within said flared portion, said flared portion also having a set of radially disposed teeth located wholly above said seat, the inner edges of said teeth being diametrically spaced apart a distance greater than the over-all diameter of said nesting ring, the tops of the teeth lying in a plane normal to the axis of the cup and spaced downwardly from the mouth edge of the cup a distance sufficient to receive a closure disc.

4. A pastry cup comprising a body portion and a flared top portion, a nesting ring on said body portion, said flared top portion having a nesting ring receiving seat spaced downwardly from the mouth of and within said flared portion, said flared portion also having a set of radially disposed teeth located above said seat, the inner edges of said teeth being diametrically spaced apart a distance greater than the over-all diameter of said nesting ring, said flared top portion having internal grooves disposed generally parallel to the wall of said flared top portion, certain of said grooves terminating in dead-end pockets and others of said grooves extending into and communicating with the interior of the body portion below said seat, by virtue of all of which one cup will nest within another cup of like construction with the nesting ring of the inner cup surrounded by the teeth of the outer cup while said nesting ring is resting on the nesting ring receiving seat of the outer cup, in a manner to allow for air circulation between the nested cups.

ALBERT ABA HEYMAN.

REFERENCES CITED

The following references are of record in the file of this patent:

UNITED STATES PATENTS

| Number | Name | Date |
|---|---|---|
| 1,615,681 | Buhse et al. | Jan. 25, 1927 |
| 2,114,205 | Balton | Apr. 12, 1938 |
| 2,281,217 | Turnbull | Apr. 28, 1942 |